United States Patent [19]

Keyser, Jr. et al.

[11] Patent Number: 5,025,373

[45] Date of Patent: Jun. 18, 1991

[54] PORTABLE PERSONAL-BANKING SYSTEM

[75] Inventors: George T. Keyser, Jr., Potomac; Carl R. Fosler, Gaithersburg; Jeffrey D. Johnson, Rockville, all of Md.

[73] Assignee: JML Communications, Inc., Washington, D.C.

[21] Appl. No.: 214,263

[22] Filed: Jun. 30, 1988

[51] Int. Cl.[5] .............................................. G06C 13/30
[52] U.S. Cl. ................................... 364/408; 235/379; 380/24
[58] Field of Search ............................ 364/408, 406; 380/24.23; 235/379

[56] References Cited

U.S. PATENT DOCUMENTS

| 457,853 | 3/1986 | Zeidler | 380/24 |
| 4,545,023 | 10/1985 | Mizzi | 364/709 |
| 4,575,621 | 3/1986 | Dreifus | 380/24 |
| 4,803,347 | 2/1989 | Sugahara et al. | 235/379 |

OTHER PUBLICATIONS

"Sharp PC-1600 Pocket Computer", Product Literature, Microsearch File of Orbit, An 87-042142.
"Voad Systems", Product Literature, Microsearch File of Orbit AN 85-028510.
"Money Counts-Financial Management Begins at Home", Abstract of Article by John Gregg, Microsearch File of Orbit AN 87-045195.
"Chemical Bank Unveils Pronto", Deborah Wise, InfoWorld, vol. 4, No. 39, 101482 (Abstract from Microsearch of Orbit).
"High Interest in Home Banking", Catherine Kent, PC World, vol. 1, No. 2, p. 6819, 3183 (Abstract from Microsearch File of Orbit).
SmartCom Instruction Manual, p. 1.3, 1984.
"Operator's Guide and Technical Reference Manual" Leading Edge p. 3.
"Home Banking: The Decision Maker's Guide", Myles Maxfield, Jr. et al., pp. 7-3, 7-16.
Wall Street Journal Article, "Citicorp Skips Computer in New Home-Banking Plan", Feb. 28, 1990.

Primary Examiner—Michael R. Fleming
Assistant Examiner—Gail O. Hayes
Attorney, Agent, or Firm—Banner, Birch, McKie & Beckett

[57] ABSTRACT

A portable personal banking system comprises a host computer and at least one portable terminal among a variety of terminals including automatic teller machines and personal computers. The portable terminal provides a range of banking services over an automatically dialed-up telephone connection to the host bank computer. The personal terminal comprises a keyboard and display capability with mininal key requirements and display capacity respectively. Furthermore, during a banking mode of operation, control resides in the host bank computer. Consequently, future modifications or additions to banking services may be implemented without any change to the personal terminal. Also, the costs of providing the present portable personal terminal banking terminals are minimal compared with known home information terminals such as videotex terminals or personal computers. Yet, a personal terminal serving system is compatible with a serving system including home or office personal computers equipped with modems, automatic teller machines and other bank service enhancements implemented by the serving bank. Also, during a local mode of operation without the banking system, the terminal serves as a personal banking manager. The personal terminal housing may comprise a front surface for data entry and display and a rear surface comprising a pocket for banking forms and a writing table.

28 Claims, 9 Drawing Sheets

```
SENDMES -  ─── CALL SENDPK(INBUF,SIZE)
               CALL WAITPK(SENDING,TIMEOUT)

READMES -  ─── CALL WAITPK(GETTING,TIMEOUT)
```

FIG. 7b

```
CASE ACTION

FF - ERASEBUFFER

CR - LINEPTR = LINEPTR+1

BS - CHARPTR = CHARPTR-1

TEXT - BUFFER(LINEPTR,CHARPTR) = ACTION
           CHARPTR = CHARPTR+1

END CASE
```

FIG. 7c

```
CASE ACTION

SCROLL UP - IF LINEPTR > 1 THEN
                    COUNT = LINEPTR
                    REPEAT
                        COUNT = COUNT + 1
                    UNTIL TOP(COUNT) = OK
                ENDIF
                SCROLLUNIT(COUNT)

SCROLL DOWN - IF LINEPTR > 1 THEN
                      COUNT = LINEPTR
                      REPEAT
                          COUNT = COUNT - 1
                      UNTIL TOP(COUNT) = OK
                  ENDIF
                  SCROLLUNIT(COUNT)

END CASE
```

FIG. 7d

```
CASE ACTION
    DOLLAR - CALL EDIT (STR,'$______.__')
    DATE - CALL EDIT (STR,'__/__/__')
    NUMBER - CALL EDIT (STR,'________')
    MENU - CALL EDIT (STR,'__')
END CASE
CALL SENDMES (STR)
```

PORTABLE PERSONAL-BANKING SYSTEM

This application comprises a microfiche appendix comprising 2 microfiche including 99 frames of computer program source code listings for which listings protection under all applicable copyright laws is asserted.

BACKGROUND OF THE INVENTION

1. Technical Field

This invention relates to home information terminals and, more particularly, to a portable personal banking system for providing a range of banking information services via an automatically dialed telephone connection from a portable personal banking terminal to a host bank computer.

2. Description of the Related Art

Traditionally, financial institutions such as banks have been stigmatized by humorous anecdotes related to the convenience to customers of obtaining services. For example, the term "banking hours" has been used to describe the limited nine o'clock to two o'clock banking day as well as the hours of any other business which might provide limited customer access. In order to make banking services more convenient, centrally located main offices of banks have provided geographically distributed branch offices to move their services closer to the customer. Furthermore, such innovations as drive-up teller windows and automatic teller machines have extended the hours of service availability. Such enhancements, however, still require the bank customer to travel to the bank or automatic teller machine to receive service.

Since the mid 1970's, there has been a trend toward the application of existing communication facilities for the transmittal and retrieval of information to and from a central source of information and data processing capability. Because of the universality of the switched telephone connection now available in the United States, AT&T, Knight-Ridder Newspapers, Citibank, IBM, CBS and others have experimented with home videotex and teletex services whereby an unintelligent home information terminal comprising a video quality display, a full alpha-numeric keyboard and a microprocessor-controlled interface is automatically connected over the telephone line to a host computer and database. Some of the services provided in such experiments included instantaneous stock quotations, home shopping, and home banking, the latter of these via an auxiliary connection from the host computer to a bank computer also via a telephone line.

Because of the great expense and size of component elements of the home information terminal such as the full alpha-numeric keyboard, video display and microprocessor controlled telephone line interface, such videotex experiments have, for the most part, proven to be commercially impractical. It was generally found that the size and expense of such a home information terminal could not be justified as the cost of intelligent personal computers decreased. Furthermore, personal computers, if equipped with a data modulator and demodulator or modem, now provide access to database service providers including banks, retail establishments, airline reservation systems and others at practically equivalent cost. Nevertheless, the cost of a personal computer is still beyond the budget of many families and cannot be economically justified. Furthermore, even for individuals who may be able to afford a personal computer, it is clear that a large segment of the population simply does not desire to use a computer through their concern for data security, over a user-unfriendly interface, or for other reasons. Consequently, there remains a requirement for a low cost home information terminal which provides a full range of information and data processing services.

As alluded to above, many banks have subscribed to a so-called network or individually provide automatic teller machines at locations convenient to customers which are accessible at all hours. A bank customer is able to obtain currency, for example, from an automatic teller machine at a retail establishment where the customer shops. Once a card bearing unique personal information is verified and account information retrieved, currency may be dispensed directly from the machine to the customer. Furthermore, transaction verification is provided by paper printout of a printer associated with the automatic teller machine. Such automatic teller machines are limited in the type of transaction they are capable of performing, i.e. currency dispensing, are expensive, must be maintained and replenished, and are not portable. Furthermore, those which are associated with a so-called network are inherently slow and are prone to customer disatisfaction.

Yet another solution is exemplified by U.S. Pat. No. 4,625,276 to Benton et al. which discloses a system for funds transfer which comprises a combination telephone and data terminal. The telephone terminal is mated with an intelligent personal card in order to accomplish a banking transaction. Consequently, the disclosure of Benton et al. provides an example of yet another trend toward transforming a plastic card into an intelligent personal terminal which still requires the additional telephone terminal with which it may magnetically or, in Benton et al., optically mate.

Still another solution is represented by the development in the computer industry of smaller sized computers. The so-called laptop personal computer today provides the features of yesterday's full size computers. Furthermore, hand-held personal computers are known which provide programmable personal diary, finance and communication link features, the hand-held unit having a full alphanumeric thirty-six button keyboard and a two line, sixteen character per line display.

In view of all of the above, there still remains a requirement for a portable personal banking system including a portable personal terminal which provides a range of banking services so that a bank customer need not travel any further than the nearest universal telephone jack to obtain service accessible at any hour.

SUMMARY OF THE INVENTION

It is thus a primary object of the present invention to provide a portable personal banking system including an inexpensive portable personal terminal for providing a range of information and data processing services.

To accomplish this object, it is a further object to minimize the key requirements of any data entry input device and the size of any data display while, at the same time, provide an easy-to-use, user friendly interface to a bank customer from a host bank computer.

It is a still further object to maximize the range of bank information and data processing services to comprise every practically deliverable information retrieval and data processing function which may be characterized as only excluding currency dispensing.

It is a still further object of the present invention to provide a personal banking terminal serving system which is compatible with other customer service delivery vehicles such as the provision of automatic teller machines and the servicing of home or business customers equipped with personal computers and data modems as well as with internal bank operations such as credit or account verifications by authorized bank employees.

It is a still further object of the present invention to maximize the application of a portable banking terminal off-line in a local mode of operation without prohibitive cost as, for example, an electronic banking manager.

To accomplish these and other objects, a portable personal banking system comprises a bank host computer and a portable personal terminal among other personal or bank teller facilities. The portable personal banking terminal in accordance with the present invention comprises a battery power source and on/off switch, a data modulator/demodulator (modem), a telephone line automatic dialer interface including at least one universal modular jack, a two line, sixteen character per line liquid crystal display, a sixteen key keyboard including numerical and function keys, a non-volatile storage memory for software and unique terminal identification, banking and certain log-on information, a random access memory for temporary data storage comprising a ten to thirty-two line screen memory, and a controller comprising a microprocessor coupled to each of these components.

With respect to data input and output, it has been found that a thirty-two character display is sufficient for all practical purposes while the keyboard may simply comprise ten numerical keys and a reasonable number of function keys without providing for upper and lower case input. In implementing the display, two lines are scrolled at a time, it being found that users are capable of reading two lines at a time more comfortably than one. Altogether, the implementation meets objectives of being user friendly and un-computer like while maximizing the possible quantity and quality of input and output.

These components in mostly integrated circuit form may be housed in a compact hand-held terminal. The terminal comprising the at least one universal telephone jack may be plugged into any wall-mounted universal jack to a telephone line and via a second jack to a separate optional telephone set connected through the terminal to the telephone line if a customer so desires. Because of built-in telephone dialing and line supervision capability, there is no requirement for a separate telephone set.

The reverse side of the hand-held terminal may provide a holder for banking forms including checks, withdrawal and deposit slips and provide a desk-like surface for writing checks. Consequently, in a local mode of operation the terminal may serve as a personal banking manager.

The bank host computer accesses a database and controls the operation of the portable personal terminal during a banking mode of operation. A plurality of services including global or personal electronic messaging to or from the user, account statement display, check or deposit verification or bank information retrieval are controlled by the host computer while during this mode the terminal acts as a slave to the host.

On the other hand, during the local mode of operation, the terminal is disconnected from the telephone line and assists the user as a form of personal banking manager, keeping track of checking or savings account numbers, deposits, withdrawals, checks and balances and performing locally programmed requests such as determining the value of the user's income retirement account when the user reaches seniority. Also, during an initialization mode of operation, the terminal automatically supervises the establishment of a telecommunications link to the host and uploads predetermined information requests for immediate response by the bank during the banking mode. For example, the user may initiate a request to determine if a check having a particular number has cleared.

The personal terminal may further comprise a timer implemented either via normally provided clock control of the microprocessor or via host computer clock control. The passage of a predetermined time period or count between bank customer data entries may automatically cause a disconnection of the terminal from the host computer and a power down of the terminal. For example, the telephone line may be disconnected after ten minutes to free the telephone line to incoming calls.

Optionally, the personal terminal may comprise an alerter or an audible tone generator to provide audible feedback to a bank customer as the customer enters data or makes choices. For example, a short tone may indicate an acceptable entry while a tone of longer duration may indicate an error. Commands to sound a short tone may also be transmitted by the host toward the terminal periodically to indicate that the host is still connected.

Upon initial turn on and telephone connection to a host computer at a bank, the customer is prompted to move from a main menu numerically identifying seven or more submenus by name: for example, view balance, account information, bill payments, transfer funds, rates and bank or ATM locations. Each feature or option item name clearly identifies the feature in less than sixteen characters. Two lines or option items are displayed at a time; however, at, for example, the end of a list, one line may describe a menu item and the bottom line a customer prompt such as: "Your choice?" The customer then depresses an appropriate numerical key 1-9 (or more if additional options are provided) in the case of main menu item entry and sequentially depresses an "enter" key to gain access to the selected submenu.

In order to provide security of data communication between a personal terminal and a host computer, a known packet data protocol, in particular, the X.25 protocol or a more efficient and reliable asynchronous protocol as herein described is used to transmit data selectively encrypted by a standard or non-standard encryption algorithm stored in non-volatile memory of the personal terminal. The herein described asynchronous protocol is also considered to be more secure than the well-known X.25 communications protocol. Consequently, data transmitted between the host bank computer and the personal terminal may be first selectively encrypted and then encoded into data packets for transmission.

During the banking mode of operation as already indicated, the personal terminal microprocessor acts as a slave to the bank host computer for data input and display, interpreting host commands and transmitting, formatting and encoding bank customer entered data for transmission to the host computer. The host bank computer performs, for example, personal terminal, account, and user number verification, bank and customer information database inquiry and retrieval and account transfer requests.

During the initialization mode of operation, software control is first lodged in the personal terminal for the purpose of establishing a telephone connection and uploading data to the host bank computer. The personal terminal software controls local data validation and display and data encryption and encoding for transmission to the host computer in the selected asynchronous packet data format. During the banking mode of operation, control is lodged with the bank host computer which performs, for example, customer verification, controls the personal terminal display of menu options and features, interprets transmitted data and exercises customer chosen option items. Consequently, there exists a partnership of personal terminal and host computer software. On the other hand, control over the provision of features and the exercise of chosen options are lodged with the host bank computer.

Because the control over menu and submenu choice selection and option item exercise during the banking mode of operation is lodged with the bank host computer, new services may be implemented without any change in hardware or software of the personal terminal.

On the other hand, the local mode of terminal operation as a personal banking manager involves a periodic updating of terminal microprocessor software. Most practically, the terminal software is permanently provided in the form of a special application software customized integrated circuit. Furthermore, the communication protocol permits the transmission of an indication of the software version provided by a particular terminal so that a host computer may be informed as to how to appropriately respond. On the other hand, software may be downloaded to the terminal from the host during the banking mode of operation. However, the greater the feature capability and flexibility provided in the local mode of operation, the more expensive the terminal becomes due to increased costs of processor and memory integrated circuits.

As briefly described above in connection with the main menu description, some of the information and data processing features available to a bank customer utilizing the present invention include but are not limited to account status inquiry, payment of bills, transfer of funds between accounts, verification of the status of a particular check, credit, debit or deposit, current loan interest rate information, bank hours, locations of automatic teller machines and branch offices and such. Consequently, practically, the only service which may not be providable from such a terminal that is provided by automatic teller machines is cash deposit and withdrawal.

One particularly important feature provided via the present invention is a feature by which the user may obtain access to what is known in the industry as the control disbursement package, i.e., checks which have not cleared yet but which have arrived on a given day for posting. A submenu under account information of the main menu assists the user to select from the following choices: find check, find by date, find by amount, get summary, all credits, all debits, all deposits and checks pending. The user selects checks pending to receive data on control disbursements. In this manner, a user obtains information so that appropriate funds may be deposited immediately to permit the pending checks to clear.

The cost of a terminal in accordance with the present invention is reduced from hundreds of dollars to dollars while further cost savings may be achieved in time and inconvenience to bank customers of obtaining similar services by known means. Furthermore, such a terminal is regarded as a means for inducing new customers to bank at a given bank and may be given free of charge to a new customer when the customer opens an account.

The present personal terminal arrangement is compatible with existing arrangements for serving, for example, home or business customers equipped with personal computers. The same bank host computer may serve either a personal computer or a home terminal. The host computer, for example, may determine from a unique terminal or personal computer identification how it will properly serve either type of installation.

There is no requirement for either a separate card validation or a requirement that any such card be "smart". Terminal identification and software version data is stored in nonvolatile memory along with Personal Account Number (PAN). Just as with a card or so-called smart card, the terminal calls for hidden from display Personal Identification Number or PIN verification before any banking services are provided.

These and other features of the present invention will become clear to one of skill in the art from the following detailed discussion of the drawings.

DETAILED DESCRIPTION

Figures 1A, 1B:
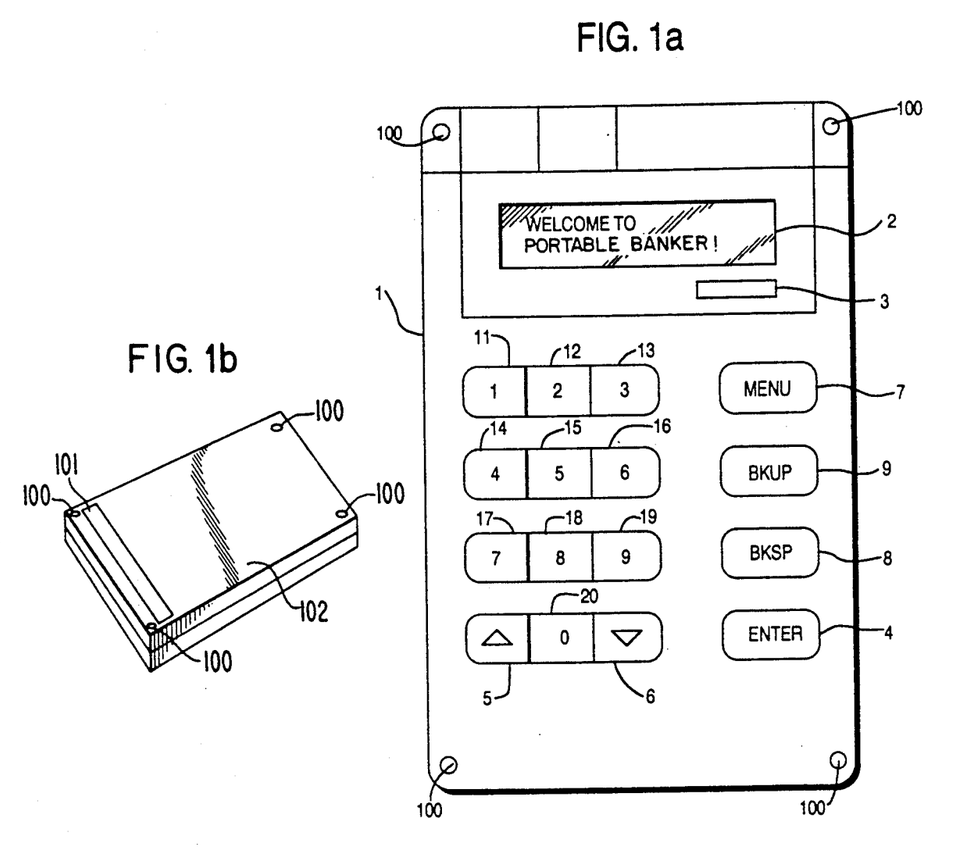
FIG. 1a is a top pictorial view of a portable personal banking terminal in accordance with the present invention.
FIG. 1b is a perspective view of the rear of the portable personal banking terminal of FIG. 1a showing a check or other banking form dispenser or holder and a flat, rigid table or writing surface.

Referring to FIG. 1a, there is shown a top view of a portable personal banking terminal in accordance with the present invention showing a data input/output top surface. Referring to FIG. 1b, the reverse side of the unit may comprise a pocket 101 or other dispenser for personal checks or withdrawal and deposit slips and rigid table writing surface 102.

Figure 2:
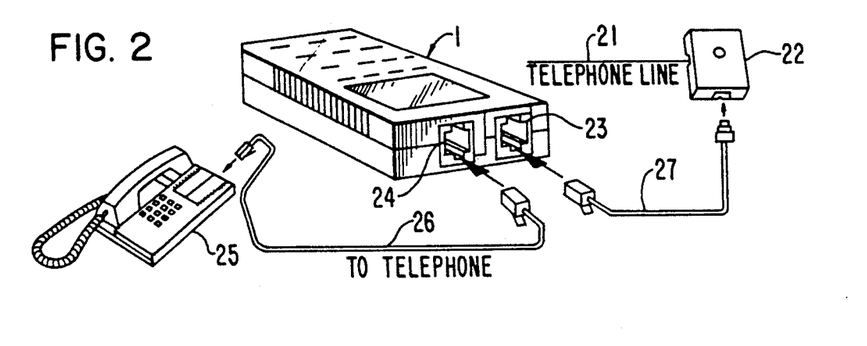
FIG. 2 is a perspective pictorial view of the portable terminal of the present invention connected via a modular jack to a telephone line and via an optional modular jack connection to a customer telephone set.
Figure 3:
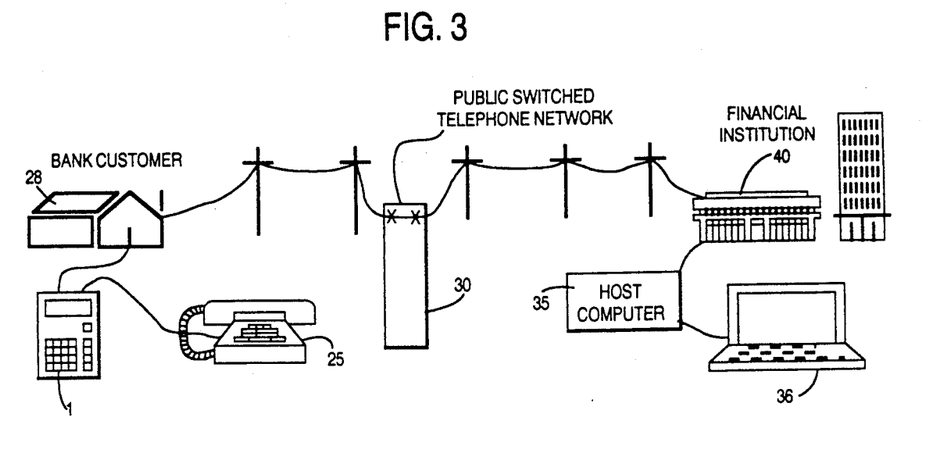
FIG. 3 is an overall personal terminal serving system block diagram showing connection of the portable personal banking terminal of FIG. 1 with a host computer at, for example, a bank location over the telephone line.
Figure 4:
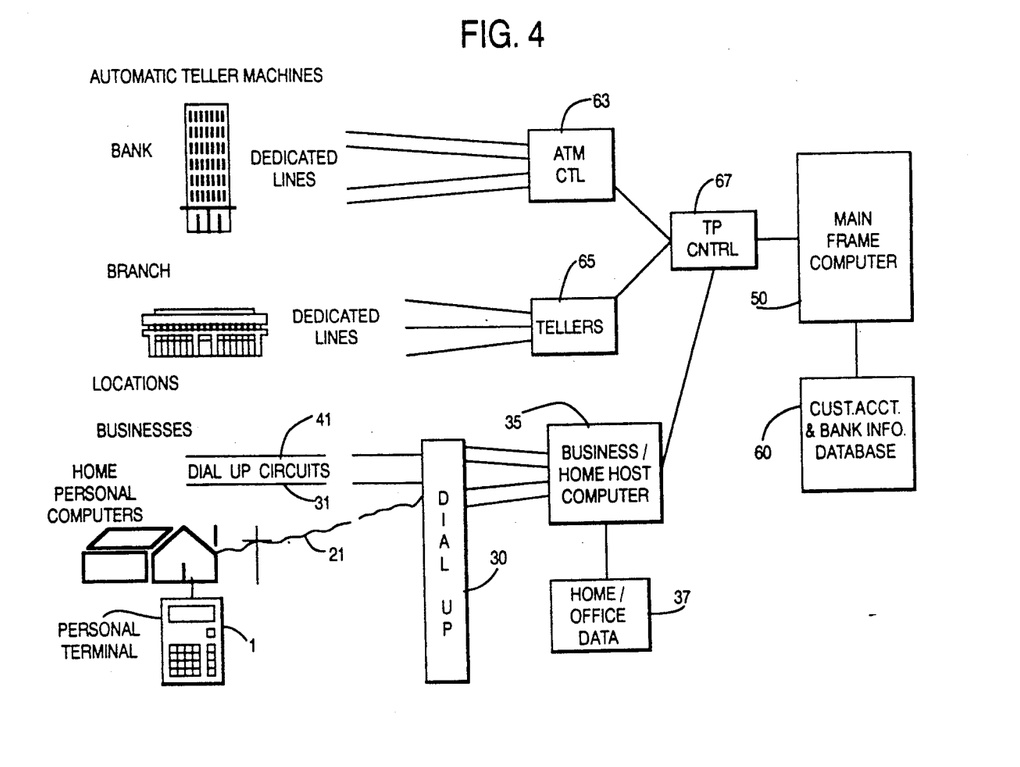
FIG. 4 is yet another overall system block diagram showing the compatibility of the present personal home terminal service with existent home or business personal computer, automatic teller machine and branch bank teller data terminal installations.
Figure 6:
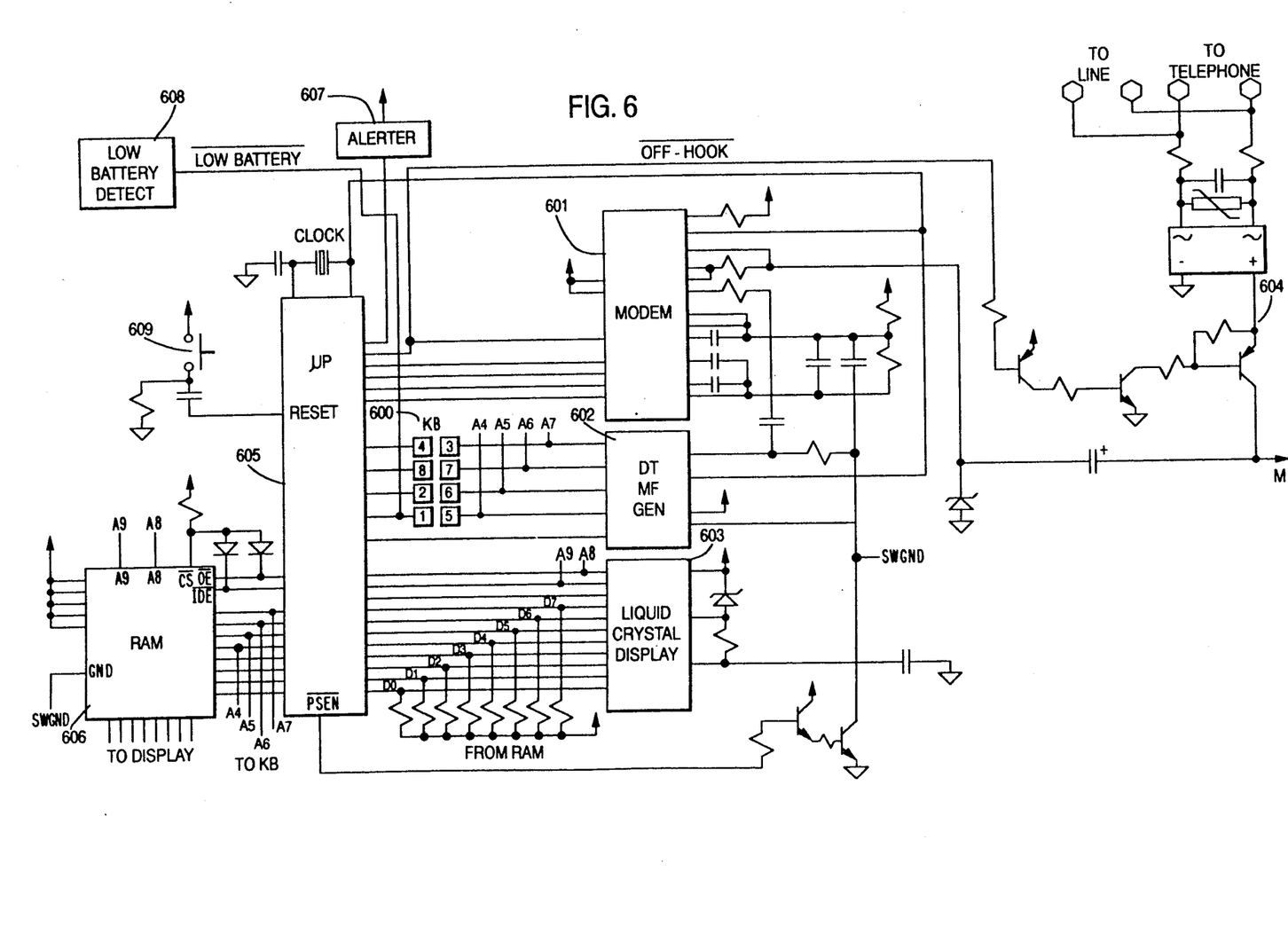
FIG. 6 is a detailed schematic block diagram of the portable personal banking terminal of FIG. 1.

Similar reference characters are employed in all figures to identify similar elements and so the portable terminal 1 is also shown in FIGS. 2–4 and a schematic block diagram of the terminal is shown in FIG. 6. Referring again to FIG. 1a or 1b, the personal terminal 1 is designed to be hand held or to be set on a flat surface during operation by a bank customer. The rigidity of the reverse surface may serve as a portable desk for check writing, for example. Keys are recessed into the top surface so when the reverse side is employed as a writing table, the keys may not be inadvertently actuated. Feet 100 provide further rigidity and support for either side.

A two line, sixteen character per line, liquid crystal display 2 provides current terminal status information to a banking customer as the customer uses the terminal in a local mode and proceeds through a particular transaction. The term "transaction" herein shall be defined to comprise the duration from a customer's turning the terminal on by depressing on-off button 3, and any use in a local mode of operation, through the establishment of a switched telephone connection to a host computer (FIGS. 3 or 4), through the several possible interactions via the subroutines identified in the information flowchart of FIG. 5 to turning the terminal off again via on/off button 3.

In a local mode of operation, the terminal is unplugged from the telephone network and operates similarly to a programmed computer. In accordance with menu driven algorithms, the user may record items in personal banking storage, for example, a numerically identified check at $25 for debiting from a terminal stored account balance. Alternatively, the user may be led to initialize the terminal to transmit a message to the host computer or request status for another numerically identified check, all checks having a particular dollar value or all checks of a particular date. The message to the host computer may simple be a request for a return call from a bank employee.

For example, during the banking mode of operation, display 2 of FIG. 1 shows the two line message, "Welcome to Portable Banker," wherein a selected service name or mark is inserted, and/or a plurality of bank marketing messages or personally addressed messages upon the successful dial up of a host bank computer. At another time during a transaction, a menu or submenu option item may be identified on the first line while a simple customer prompt such as, "Your Choice?" will be displayed on a second line with an empty data field for choice entry. At still other times during a transaction, the second or bottom line will be provided in the form of an empty data field into which field, for example, a dollar and cents amount field may be completed between a dollar sign and a decimal point by keyboard entries of a bank customer, most significant digit first. Alternatively, a date may be inserted in month, day and year format between forward slash marks. Alternatively, a day, month, year format may be used in Europe or elsewhere if appropriate.

To accomplish numerical data entry, a complement of ten numeric keys 11–20 are provided. After the completion of the partial or complete line comprising the data field is in agreement with the bank customer's desired entry, the bank customer depresses the ENTER key 4. In the interim between data entry and data display, the data is first locally verified to assure accurate data transmission to the host computer. For example, if the user inadvertently enters a month value greater than twelve, the user may be informed of their mistake and requested to reenter the data appropriately.

In order to display the last or succeeding menu or submenu option item, a bank customer utilizes the up or down arrow function keys 5 and 6 respectively. A bank customer may at any time return to the main menu by depressing the "MENU" key 7. If the bank customer inadvertently enters a wrong numerical value, it may be erased by depressing the backspace BKSP key 8. This BKSP key 8 thus provides a local editing feature. If the user wants to back up to a higher level or the preceding submenu selected, the user may recall the previously displayed sub menu information by depressing the back up BKUP key 9. Both the MENU and BKUP function keys are controlled and implemented from the host in the banking mode of operation and are controlled by terminal software during the local mode of operation.

The two line display may be provided at an angle to the horizontal and so slightly impressed in the terminal to facilitate viewing of the display and alleviate effects of glare. When the main menu or submenu option items are scrolled two items at a time, they may be displayed and scrolled at predetermined intervals such as every two seconds to free the bank customer from having to manually depress the up and down arrow keys 5 and 6. These intervals relate to the rate of data transmission such as 300 band between host and terminal but may be intentionally slowed by a supplemental delay input by the user or set in default by the bank. Even during scrolling, a menu or submenu choice may be entered and acted upon by the host computer to save time.

When power is turned off, battery is still provided to ensure preservation of temporary memory storage. Also, non-volatile memory is provided within the terminal for storage of terminal software, personal banking information, and unique terminal and user identification data. Within the software are provided standard or non-standard data encryption algorithms to selectively insure the security of data transmission over the telephone line, for example, the so-called data encryption standard (DES) or a simpler scheme such as one implemented via an exclusive or (XOR) gating of data with a host and terminal shared random number table.

Referring now to FIG. 2, there is shown a pictorial representation showing how the personal terminal 1 is easily connected to a telephone line 21 via a standard single line modular jack 22, type RJ11C, available at most telephone supply retail outlets and now typically provided in each room of new home construction. The personal terminal 1 is equipped with two parallel connected jacks 23 or 24 for connection to the single line jack 22 or to an optional telephone set 25. It should be noted that the personal terminal requires no telephone set 25 as it comprises a microprocessor controlled automatic dialer and telephone line supervised interface.

Double-ended lines 26 and 27 equipped with standard universal pinch-type locking plugs connect either the telephone 25 to the personal terminal 1 or the personal terminal 1 to the single line jack 22. Such lines 26, 27 are also generally available from telephone retail outlets in assorted lengths and equipped with other types of plugs at one end. The arrangement as shown in FIG. 2 is more descriptive of a permanent home office desk installation than a portable installation. When it is desired to use the personal terminal elsewhere including at a location outside one's home or office, the telephone may be disconnected via line 27 from jack 22 and the combination of terminal 1 and line 27 may comprise a portable hand held banking terminal complete with electronic check book connectable whenever desired to any compatible telephone jack installation. Also, the terminal 1 may be operated without line 27 in a local mode of operation as a personal banking manager.

Referring now to FIG. 3, there is shown an overall block diagram showing the connection of a personal terminal 1 at the home 28 of a bank customer via the public switched telephone network 30 to the location of a banking or other financial institution 40. Personal terminal 1 automatically dials a prestored or customer entered telephone number of a line to financial institution 40. At financial institution 40, a dial up port of host computer 35 is accessed at which point the "Welcome to Pocket Teller" message is caused to be displayed at personal terminal 1. At financial institution 40, bank personnel access host computer 35 by way of a data terminal or personal computer 36, for example, for updating customer or bank information data stored in an associated database (not shown).

All communications between host 35 and terminal 1 are preferredly asynchronous, 300 baud, 8 bit data, no parity, 1 stop, using Bell 103 or 212A compatible modems. While somewhat similar to the known X.25 communication protocol, the following described protocol is preferred for its reliability, security, and efficiency.

CONTROL PACKETS are sent to and from the terminal with the following format:

SOH/LENGTH/CONTROL/HEADER
CKSUM/EOT.

DATA PACKETS are sent to and from the terminal with the following format:

SOH/LENGTH/CONTROL/HEADER
CKSUM/DATA FIELD/CRC 16/EOT.

In these packets, SOH is the starting character of 01H.
LENGTH, 1 byte, defines the number of bytes in the data field DATA FIELD; not including CRC, the length variable ranges from 0 to 255.
CONTROL, the control byte, is defined as:
  Data packet—0×H Data packet with sequence number x, and
  Control packet— 8×H Acknowledge all previous packets, and 9×H Reject previous packet numbered x where x is a 3 bit value in the range of 0-7 that numbers each packet, and is incremented on each new (non-repeated) data packet.
HEADER CKSUM is defined as the 2's complement of the arithmetic 8 bit sum without carry of SOH, LENGTH, and the CONTROL byte.
DATA is an optional field depending on LENGTH of up to 255 bytes.
CRC 16 is the 16 bit (2 bytes) of known cyclic redundancy check CRC computed over the DATA FIELD only and transmitted low byte followed by high byte. CRC is not sent if LENGTH=0.
EOT is the end of packet character of 04H.

The data field of each packet contains 8 bit ASCII data codes. Upper and lower case alpha-numeric codes can be displayed at terminal 1. Codes greater than 7FH and less than 20H are reserved for control codes. The character codes and fonts are selected from well known codes and fonts for efficiency and readability.

The following control codes CONTROL are accepted:
BEL (07H) Sound tone (or bell) for 0.5 sec, long BEL.
BS (08H) Backspace cursor, does not erase existing character.
HT (09H) Sound tone (or bell) for 0.2 seconds, short BEL.
FF (0CH) Form feed erases screen and resets display to top line.
CR (0DH) Carriage return performs auto line feed, then resets the cursor to the left-most column.
SO (0EH) Disables encryption both ways, host to terminal or terminal to host. This is the default state.
SI (0FH) Enables encryption of all data in packets transmitted to the host. Default is encryption disabled.
DLE (10H) Enter hidden string mode; displays '*' for each number entered by the user at the next prompt only. Resets after the prompt is completed.
DC1 (11H) Enter exact string length mode; user must fill all displayed '_' prompt characters before ENTER is accepted at the next prompt only. Resets after the prompt is completed.
DC2 (12H) Enable encryption of data from host to terminal starting with the next data packet.
EM (19H) Instructs terminal to not display the current row position on the top line of the display, always displays on the bottom line of the display. Used to link two lines together for two line scrolling.
SUB (1AH) Resets the terminal to the same state as power-on. This command will disconnect the terminal from the phone line. May be used as an exit from the banking mode of operation.
FS (1CH) Select display page A. (default)
GS (1DH) Select display page B.
RS (1EH) Select cursor page A. (default)
US (1FH) Select cursor page B.
P# (8×H) Prompts user for numeric string input, maximum length of x+1 characters, terminated by the ENTER key. This code instructs the terminal to display x+1 underline characters, where x is a four bit value in the range of 0 to 15.
P$ (9×H) Prompts user for a dollar amount input, maximum length of x+1 characters, terminated by ENTER key. This code instructs terminal to display x+1 underline characters as '$______.__', where x is a four bit value in the range of 0 to 15.
PM (A×H) Prompts user for a single menu selection input with a number between and including 0 to x, where x is a value between 1 and 9. The exception of x=0 is an invisible prompt for the ENTER key to be pressed without any numeric entry.
P/(B0H) Prompts user for a date entry of 6 numbers. The terminal displays '__/__/__' expecting either five or six numbers terminated with the ENTER key.
ROW (C×H) Loads the screen row address to x, where 0 is the top line of the display and x is a row number between 0 and 15.
COL (D×H) Loads screen column address to x, where 0 is the left-most character position and x is a character number between 0 and 15.
DSP (E×H) Terminal displays from line number x, where x is between 0 and 15.
MEM (F×H) Save/Recall strings in/from terminal control memory.
  F7H Recalls the terminal phone number storage.

F6H Recalls Host specified 16 character string.
FFH Saves the following 16 bytes of packet data in phone number memory locations.
FEH Saves the following 16 bytes of packet data in a host specified 16 character string storage.

The terminal keyboard entered data returned from user prompts is ASCII coded and placed in a data packet as previously defined in the above-described COMMUNICATIONS PROTOCOL.

Examples of data from each type of prompt follows:

| P# | (string prompt) | '12345678' | |
|---|---|---|---|
| P$ | (dollar prompt) | '1234567' | to be interpreted by the host as '12345.67' |
| PM | (menu choice prompt) | '1' | |
| P/ | (date prompt) | '120387' | to be interpreted by the host as '12/03/87' |

MENU returns a data byte to the host of 09H in a banking mode of operation,

BKUP returns a data byte to the host of 0BH in a banking mode of operation,

BKSP is not returned as described above and is used locally for keyboard entry editing, ENTER terminates the prompt and does not generate any return data.

While at a user prompt during the banking mode, a pressing of the MENU or BKUP keys will cause the terminal to ignore any data entered at the prompt and keys will transmit the code for MENU or BKUP to the host in the data field of a packet with LENGTH=1. While at a menu prompt (PM, A×H), pressing ENTER without any numeric entry will return a packet with CR (0DH) in the data field. Upon completion of a prompt, the next character transmitted from the host to the terminal will be displayed in the first character position to the right of the prompt.

In accordance with the above-described communications protocol, all packets received by the terminal with a good CRC check will force an acknowledgement packet to be transmitted to the host containing no data field, i.e., having a length byte of 0 and the control byte indicating acknowledgement. On the other hand, if the received data's CRC check fails, a packet will be transmitted to the host with the control byte indicating a packet rejection. If the host receives neither an acknowledgement or a rejection packet while waiting for a predetermined period such as 10 seconds, the host should retransmit the last packet. Only one packet is allowed by the host to be outstanding at any time. Packets containing user prompt data transmitted from the terminal to the host should be acknowledged by the host to the terminal in the same manner as described above. Packets received with a bad Header Checksum are to be ignored and no rejection packet is to be transmitted.

Upon successful connection to the host computer during the initialization mode, the terminal sends at least a packet to the host with a data field containing terminal identification information as 'HIT Vx.y', where x and y are numbers associated with the terminal software version. The characters HIT distinguish the terminal as a portable personal terminal. The cursor and display page defaults to page A and encryption is disabled.

The keyboard is active in the local mode of operation and at any user prompt input. Pressing the ON/OFF key to turn the unit off while on-line will disconnect the terminal from the phone line.

If encryption has been selectively enabled in accordance with the protocol, all subsequent data fields transmitted from the terminal to the host will be encrypted using the following routine:

```
ptr = CRC.TABLE + HEADER.CHECKSUM
loop LENGTH times
        Transmit [(Data to transmit) XOR ptr]
        ptr = ptr + 1
    endloop
``` where HEADER.CHECKSUM and LENGTH are the values of the header checksum and data field length defined in the packet header. CRC.TABLE is the first location of a host/terminal shared lookup table used to generate the packet's CRC data.

Referring now to FIG. 4, there is shown an overall schematic block diagram of a banking data processing and information retrieval system in which personal terminal 1 comprises only one element. For example, personal terminal 1 is connected via the public switched network 30 to business/home host computer 35. Business/home host computer 35 may be a minicomputer or large personal computer having other dial up ports which may be accessed by businesses equipped with personal computers over lines 41 or by home personal computers 31.

As described in the background of the invention section above, the personal computers are equipped with data modems and may perform all the options provided to the personal terminal 1, however, with greater keyboard and display capability. The problem solved by the present personal terminal 1 is to provide practically equivalent features and options at a fraction of the cost while demonstrating a user friendly interface to the bank customer.

Business/home host computer 35 may perform practically all tasks associated with service provision to any one of dialed up lines 21, 31, or 41 including one serving personal terminal 1. Home/office database 37 comprises all identity verification data for all connectible office or home terminals or computers while the main frame computer 50 is accessed for retrieving customer account information, bank location and loan interest information from database 60. Host computer 35 may identify whether the dialing installation is equipped with a terminal or a computer from the unique identification data transmitted and serves the installation appropriately.

Also, according to FIG. 4, automatic teller machines are served over dedicated telephone lines by means of automatic teller machine controller 63. Bank teller inquiries from branch bank locations are served over dedicated telephone lines by teller controller 65. Teller controller 65, bank host computer 35, and ATM controller 63 all interface with a bank's mainframe computer 50 via a telecommunication processor (TP) controller 67. All require access to the same main bank maintenance account and information database 60 where are stored customer account data and, optionally, current interest rate, bank location and hour data and other accessible data. Home/host computer 35 and database 37 downloaded with data from the mainframe 50 preferably serves as the source for bank information generally. Bill payment, for example, may be accomplished via either home/host computer 35 or mainframe 50 but preferably by home/host computer 35 via database 37.

Figure 5:
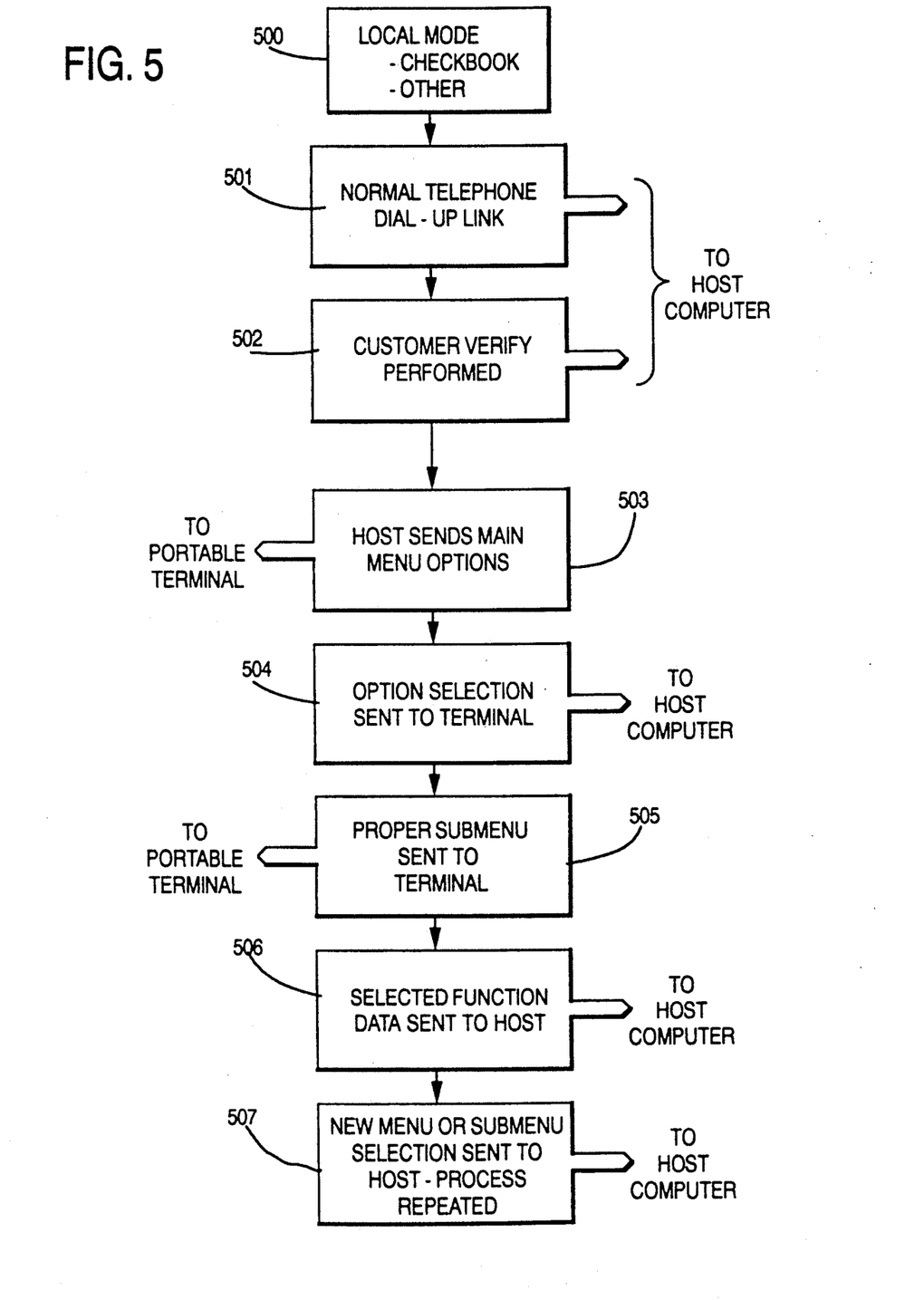
FIG. 5 is an overall system transaction control chart showing host and personal terminal information flow.

Referring to FIG. 5, there is shown an overall system control chart describing information flow to either the home terminal or the host computer. The flowchart will now be described with reference to the home terminal 1 (FIG. 1a and 1b) and the system block diagram (FIG. 4).

Box 500 represents the local mode of operation in which there is no information flow to the host. A number of well known applications software packages may be operated in the local mode: electronic checkbook, account balance, foreign exchange conversion, calculations related to interest rates such as the future worth of monthly deposits and so on, only limited by one's imagination. The more applications software provided in the personal terminal the more costly the terminal. Consequently, if the terminal is to be given away to new banking customers, applications software may be initially limited and optional applications software provided at additional cost.

According to box 501, all software associated with the local mode of operation of the personal terminal, with personal terminal initialization and with establishment of a switched telephone connection to the host computer 35 is associated with personal terminal 1. Box 500 for instance passes initial requests to box 501 for actuation. To enter the initialization mode, the terminal must be connected to a telephone line. The customer depresses "on" button 3 activating the terminal which first initializes itself before going off-hook. Thereafter, a prestored or customer entered telephone number is automatically dialed. Once the telephone number is dialed, the call is supervised to insure that a connection is established, i.e. the number is not busy or the number has not been misdialed. Data representing the unique personal terminal number is then retrieved from non-volatile memory, encrypted and formatted in accordance with the known X.25 packet data protocol or preferred protocol as described above for transmission to the host computer 35. The host computer 35 is responsible for identifying the transmitting entity as to whether it is a personal computer or personal terminal and its software version and so establish an appropriate serving software interface. In so doing, the unique personal identification number is used to access data retrieved from a customer database associated with the host computer. Also, a first personal account number or PAN transmitted by the personal terminal is verified. The host computer then replies by requesting via the display 2 the user's personal identification number, known in the industry as a PIN.

At box 502, under control of the home terminal, the personal account and identification number is transmitted to the host computer and verified. The personal identification number PIN is verified at the host computer 35 by comparison with personal data retrieved from the customer database 37. If the PIN is wrong, then PIN data entry is requested again. Otherwise if correct and if the user has preset the terminal to request certain features or already, for example, entered a check status request, this request may be forwarded by the terminal at this time.

Also if the PIN is correct, at box 503 the host computer 35 acts on the initial request and enters a submenu or if no initial request is presented, transmits a main menu option list to the personal terminal where it is locally stored, for example, in a ten to thirty-two line screen memory. The screen memory is chosen, for example, to be large enough to store the main menu and the largest sub-menu of the main menu. Furthermore, the host computer actuates the personal terminal to scroll through the option items two at a time at, for example, two second intervals including the expected data transmission delay until the entire list is displayed. As already indicated, the screen display hold time need not be predetermined at two seconds but may be user or host computer programmable.

The main menu comprises a number of numerically identified choices or option items, each of which comprises a descriptive legend of a character length less than the length of the display. For example, the main menu list may be:

1—View balance
2—Account Information
3—Bill Payment
4—Transfer Funds
5—Rates
6—Bank locations
7—Change Accounts (PAN & PIN)
8—Bank Information
9—ATM Locations
10—Exit (End Session)

At the end of the menu list, the last menu item may be displayed on one line while a prompt and blank data field may be displayed such as: "Your choice?—"

The bank customer then is to enter a choice by its number and depress the ENTER key. For example, a check or deposit scanning feature is implemented via a hierarchical set of submenus under Account Information.

For example, a submenu under Account Information may comprise the following choices:

1. Find check
2. Find by Date
3. Find by Amount
4. Get Summary
5. All Credits
6. All Debits
7. All Deposits
8. Checks Pending The first of these locates a check by number, the second all checks of a particular date, and the third all having a particular amount. Up to four account numbers (PAN) may be stored for a particular individual and so Get Summary retrieves an account summary for the entered account. To change account, one must return to the main menu, for example, by depressing the MENU key and actuating choice 7. The retrieval of all credits, debits and deposits is self-explanatory. Checks pending is a feature by which the user receives check data by number and amount as to what is pending for posting on a particular day. In this manner, the user may make appropriate deposits to the account on that day to cover the checks to be posted.

According to box 504, the data is transmitted to the host computer 35 after it is locally verified for reasonable accuracy. Furthermore, the data is selectively encrypted, for example, the personal account or identification codes and then formatted into data packets for transmission.

According to an optional feature, an audible tone of a short duration may signal a data entry that is reasonable while one that is not reasonable may be signalled by a tone of relatively longer duration, for example, when the number key depressed has a value which exceeds the number of possible choices.

The personal terminal stores all menu choices in local screen memory freeing the host computer 35 to perform other tasks. The bank customer may use up/down arrow keys 5 and 6 to proceed through the list or use the BKSP key to edit a data entry.

Once the option item number is transmitted to the host computer 35 and the ENTER key 4 depressed, at box 305, the appropriate sub-menu, again comprising a list of numerically identified choices is transmitted to the personal terminal. As before, the list may be also stored in screen memory at the personal terminal and scrolled through two items at a time until complete. Also, the bank customer may return to the main menu by depressing the MENU key 7 at any time or move to a menu or submenu one hierarchical level removed via the BKUP key 9.

At box 506, a selection function within the sub-menu list is acted upon by the host computer 35 once a numerical choice is entered and the ENTER key depressed as before. In reply, the host computer leads the customer through a multi-step process such as determining the status of a personal check which may have been cashed or simply provides requested information such as the nearest location of a branch bank or automatic teller machine.

At box 507, a new menu or submenu selection may be made and transmitted to the host computer and the entire process repeated until the transaction is ended by either an intentional depression of off button 3, the selection of the End Session option of the main menu, or the passage of a predetermined period of time such as ten minutes between customer data entries timed either via terminal 1 or host computer 35. The latter time-out feature frees the telephone line 21 for incoming calls in the event the customer has been taken away from the transaction.

Now referring to FIG. 6, there is shown a detailed block schematic diagram of the portable personal banking terminal 1. The personal banking terminal comprises a data entry device, for example, a keyboard 600 having numeric and function keys. Keyboard 600 most conveniently comprises a four by four matrix of keys having no upper or lower case, the object being to simplify keyboard use by a user. A five by four matrix may be used if additional functionality is desired. A six by six keyboard would be required for full alphanumeric capability. To format data for data transmission, there is provided a data modem 601. A tone generator 602 is provided for telephone line signaling by dual frequency tone generating means while alternatively, a make-/break connection of the telephone line may provide dial pulse type signaling via telephone line interface 604. Telephone line interface 604 is shown as connected in parallel with a telephone line and with an optional telephone set as pictorially shown in FIG. 2. In this manner, either the telephone set or the personal terminal may go off hook to request telephone central office dial tone if both are connected to the telephone line 21.

Display and control 603 is provided to display, for example, two lines of characters, each line having sixteen characters. Alternatively, one to three line liquid crystal displays where each line may display 12 to 32 characters may be provided in keeping with the principles of the present invention.

Microprocessor 605 is coupled to the keyboard 600, the modem 601, the display 603, the tone generator 602 and an optional alerter or audible tone device 607. The alerter 607 emits a short tone burst in the event of a reasonably correct entry and a longer burst in the event of a clear error. Short tone bursts may be commanded by the host at periodic intervals to indicate to the user that the host is still connected.

Responsive to ON button 609, the microprocessor is initialized into at least the local mode of operation and if the phone line is connected proceeds to establish the dialed connection to the host computer via an OFF-HOOK signaling lead and/or tone generator 602 using a telephone number stored in non-volatile battery backed-up memory or one entered via keyboard 600.

Random access memory 606 is provided for storing screen data transmitted from the host computer and keyboard entries from keyboard 600 until acted upon. Screen memory may comprise from 10 to 40 lines of data capacity. Battery power to random access memory 606 is preserved regardless of the status of "on" switch 609.

As indicated, the power source is a battery which may run low and, hence, a low battery indicator circuit 608 is provided to provide a low battery signal to microprocessor 605. Microprocessor 605 may in turn cause a low battery indicator signal to be displayed on display 603.

Figure 7:
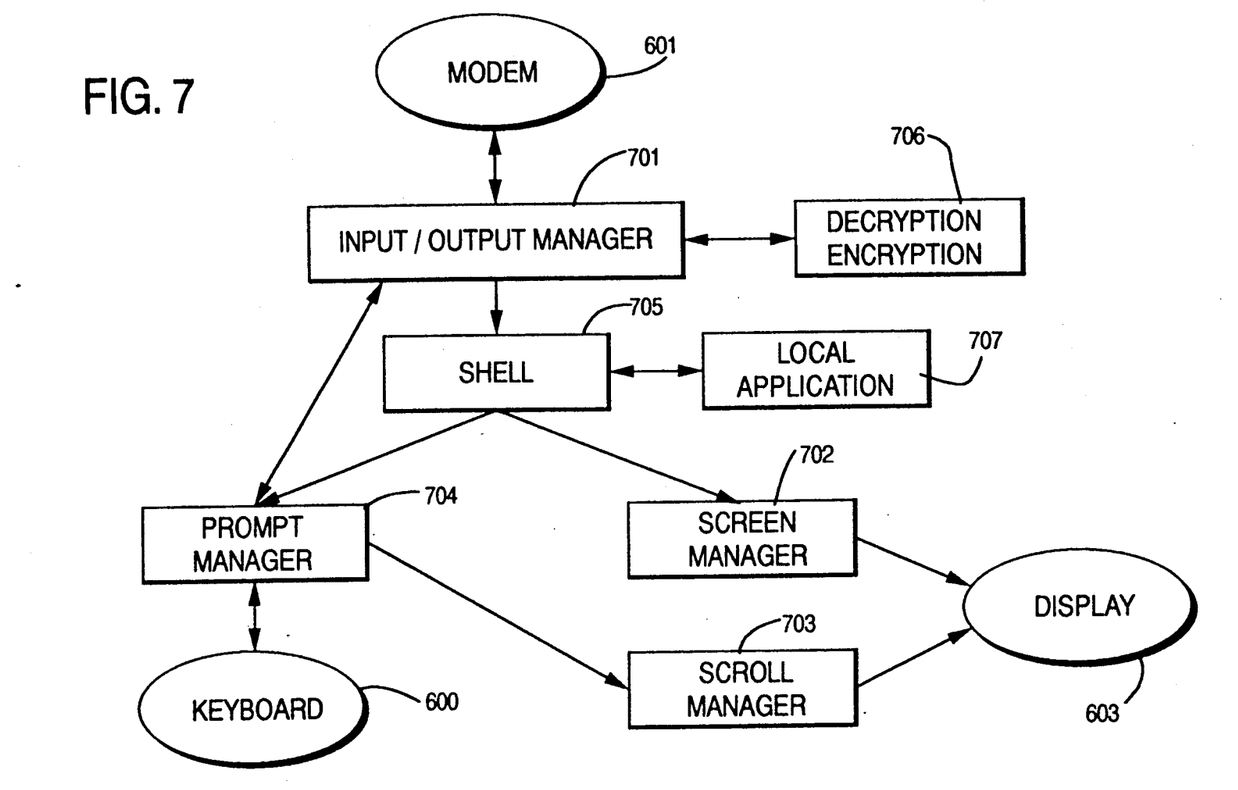
FIG. 7 is an overall subroutine flowchart for the software algorithms of the personal banking terminal.

Referring now to FIG. 7, there is shown an overall subroutine flowchart for the software algorithms of the personal banking terminal and the relationships between the algorithms and hardware components, i.e. the modem 601, keyboard 600 and display 603 shown in FIG. 6. The input/output manager of box 701 is responsible for providing data formatting/deformatting in accordance with the above described protocol and encryption/decryption. For encryption/decryption, software algorithm 706 is called. In particular, data received from prompt manager and memory are formatted in the protocol for transmission via modem 601 to host bank computer 35 after encryption by, for example, the well known data encryption standard DES or a simpler proprietary algorithm such as a logic gating of data with data from a shared look-up table. The data must be in packet data form in accordance with the well-known X.25 data transmission protocol or the herein described and referred protocol and algorithm.

In the other direction, data packets are received from the bank host computer 35 via modem 601, deformatted and decrypted and transferred via shell 705 to screen manager 702 for display on display 603 or via prompt manager to scroll manager 703 for display.

Shell 705 is responsible for determining if the terminal is in a local or other mode of operation and governs the terminal accordingly.

Screen manager 702 is responsible for managing display on display 603. Received data is temporarily stored in terminal memory and called by scroll manager 703 when required.

In the meanwhile, prompt manager 704 is responsive to either keyboard 600 data entries or shell commands from to I/O manager box 701 to actuate or deactuate scroll manager 703. The prompt manager prioritizes data for display and participates in local data validation.

Scroll manager 703 interfaces with display 603 and responsive to a user or host programmable hold time may scroll through menu or submenu option items in accordance with the programmed display hold time and the downloading of data from the host computer. Alternatively, the scroll manager responsive to prompt manager 704 and key board entries may go forward or backwards through an option item list or notify the host computer to return to the main menu or backup one level of menu.

Figure 7A:
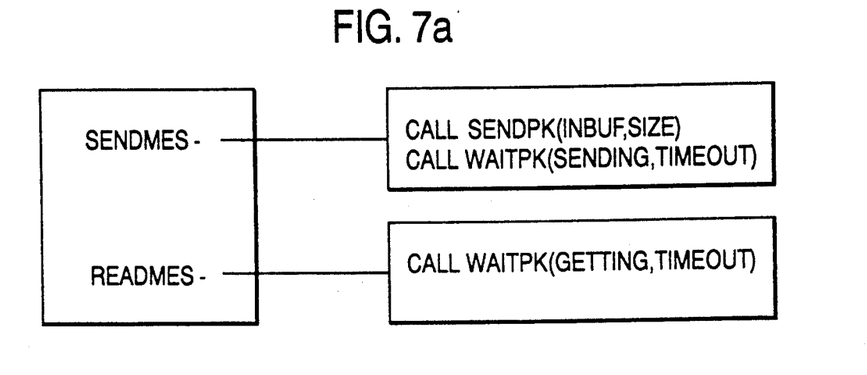
FIGS. 7a through 7f provide in flowchart/algorithm format information of use to one of ordinary skill in the art in providing algorithms of FIG. 7.
Figure 7B:
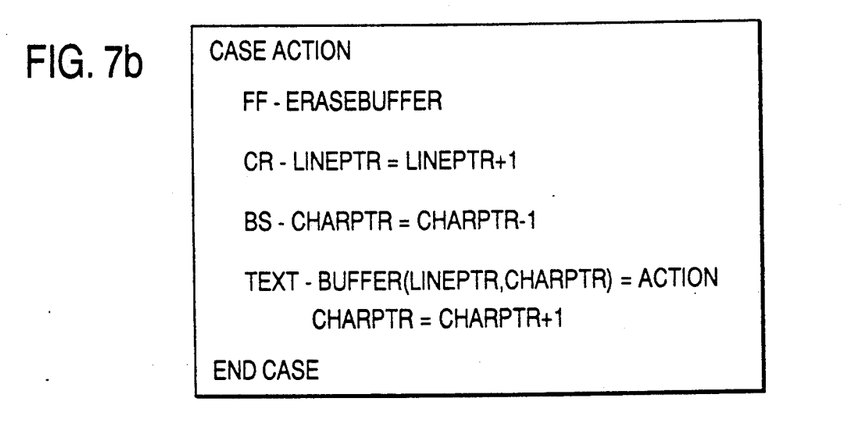
Figure 7C:
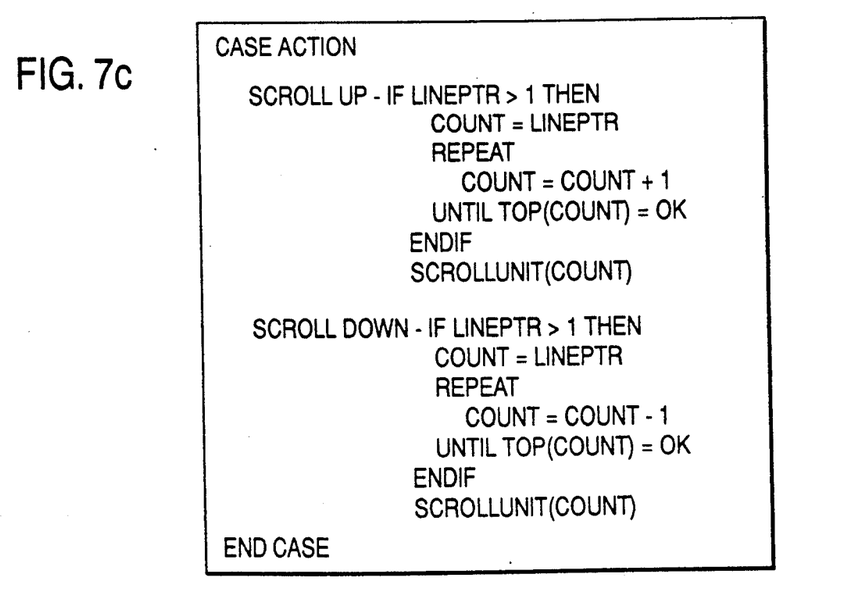

FIGS. 7a through 7f provide further detailed description of the functions of the algorithms shown in FIG. 7. Referring to FIG. 7a, the Input/Output manager is primarily concerned with the transmission and reception of data. Referring to retrieved characters at a particular line. The scroll manager relates to display of menu items and other scrolling two lines at a time.

Figure 7D:
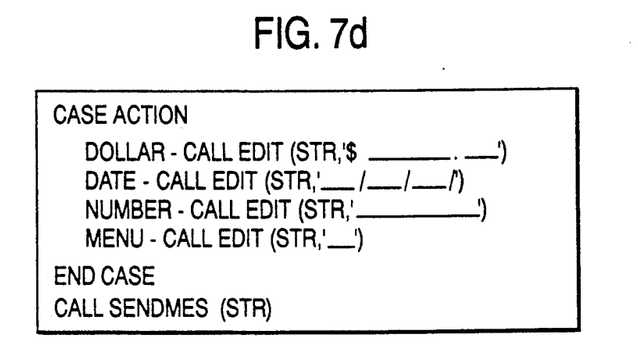
Figure 7E:
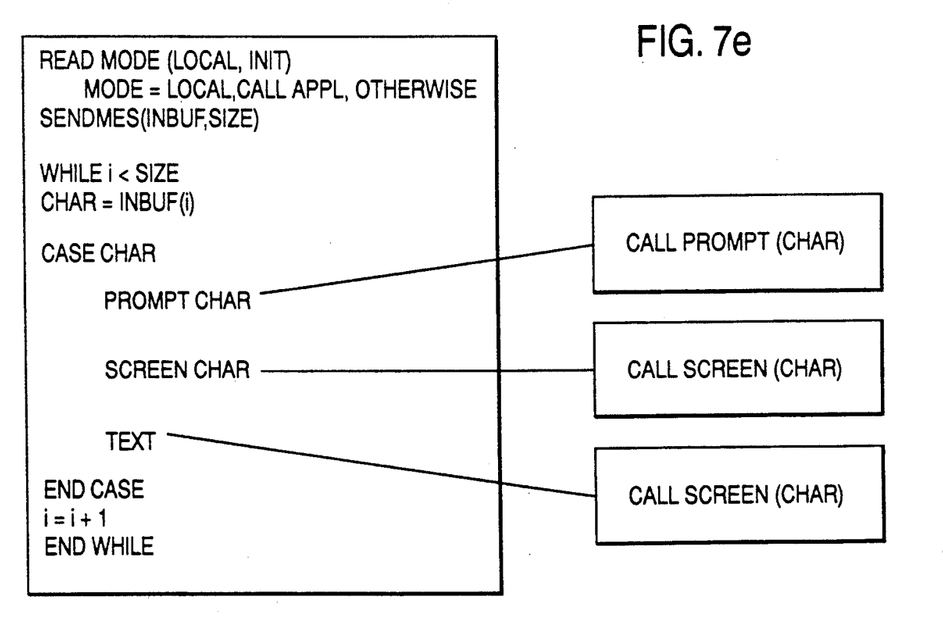
Figure 7F:
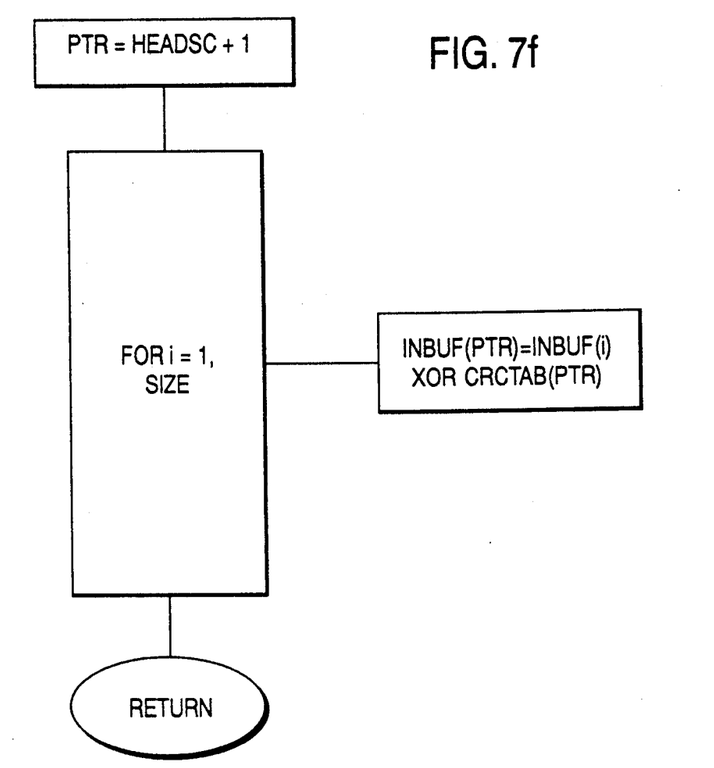

Referring to FIG. 7d, the prompt manager manages the four types of user prompts for data: dollars, dates, numbers and menu choices. Referring to FIG. 7e, the shell is a supervisor, program which determines status and, if appropriate, reads input messages and determines what action or program to call next. If the terminal is not pluged into a phone line, a local mode is assumed and local applications software 707 is called. The depicted encryption of FIG. 7f is preferred for its simplicity. A pointer is selected and for each byte up to the variable size, looks up a random byte in a table and logically performs an exclusive or gating of the data byte with the random byte or the inverse for decryption.

Figure 8:
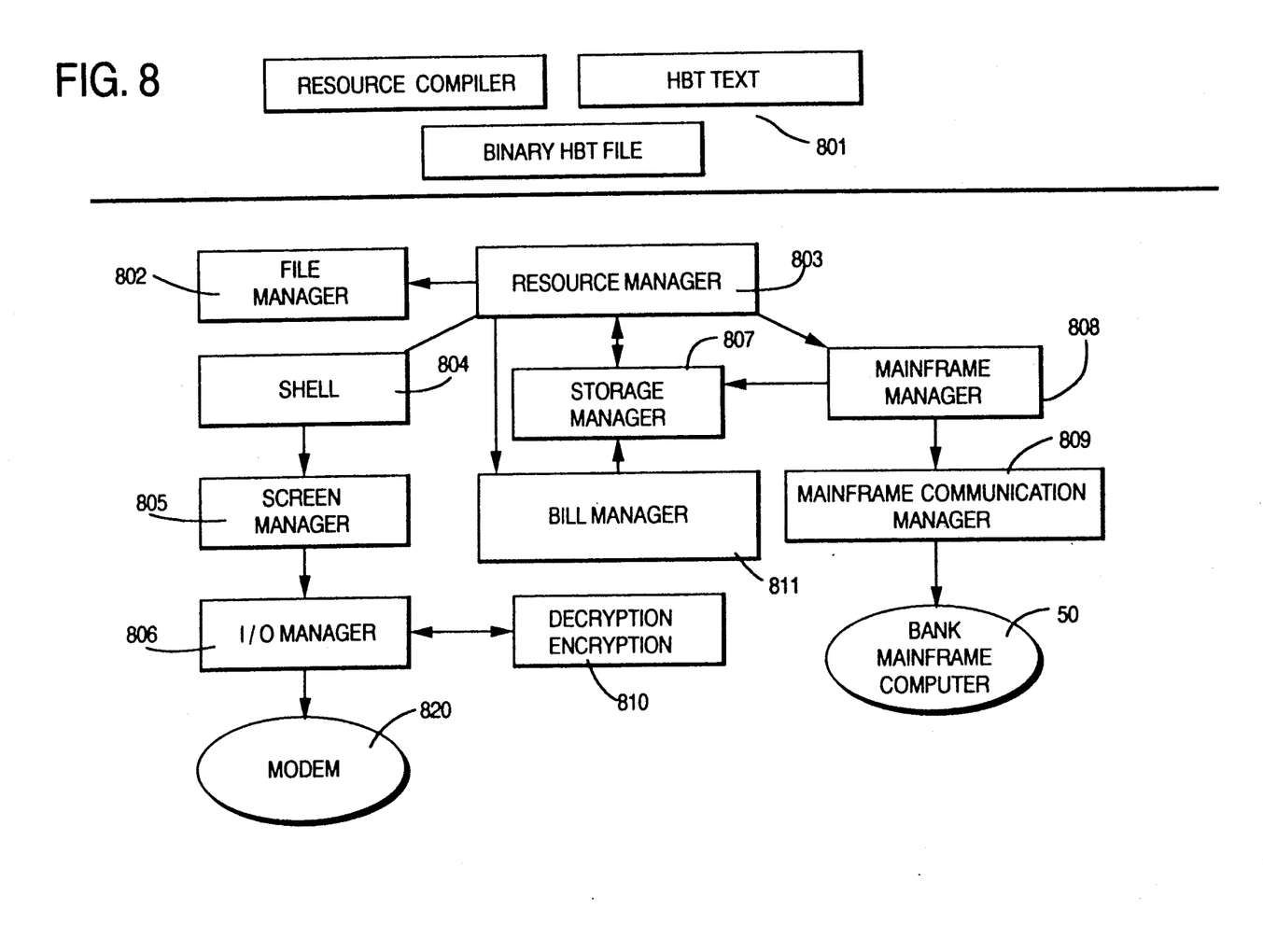
FIG. 8 is an overall subroutine flowchart for the software algorithms of the bank host computer.

Referring to FIG. 8, there is shown an overall subroutine flowchart for the software algorithms of the bank host computer 35. Stored in memory 801 at the bank host computer 35 are a resource compiler for the backbone of the host bank computer software, the resource manager, a textual database for home or business personal terminals or personal computers and a related binary database of files.

Via modem 820 of bank host computer 35 which has been connected via the public switched network 30 to modem 601, data is received from and transmitted toward personal terminal 1. Input/Output I/O manager box 806 similarly to I/O manager box 701 of FIG. 7 is responsible for formatting/deformatting and encryption/decryption of data. As shown decryption/encryption box 810 is selectively called by IO Manager 806 when required.

Screen manager 805 is primarily responsible for formatting the screens sent to terminal 1 and setting the screen manager 702 of the personal terminal. It also retrieves data received from the personal terminal and provides the retrieved data to shell program 804.

Shell or terminal control program 804 is called by resource manager 803 for any so-called resource gathering necessary to respond to a customer inquiry.

Resource manager 803 must access the memory 801 via file manager 802 or answer queries by accessing mainframe computer 50. To manage input/output to and from the mainframe computer 50, there is provided a storage manager 807 which also interfaces with mainframe manager 808. Responsive to resource manager 803, mainframe manager 808 formats appropriate inquiries and receives data responsive thereto from mainframe computer 50. To manage communications with mainframe computer 50 which must also communicate as shown in FIG. 4 with automatic teller machines, bank tellers and such, there is provided mainframe communications manager 809. Bill manager 811 is called by resource manager 803 for bill payment management. Bill payment output is provided to storage manager 807.

Detailed software listings for all bank host computer software are provided in the form of a microfiche appendix to assist one to practice the above-described invention.

Figure 9:
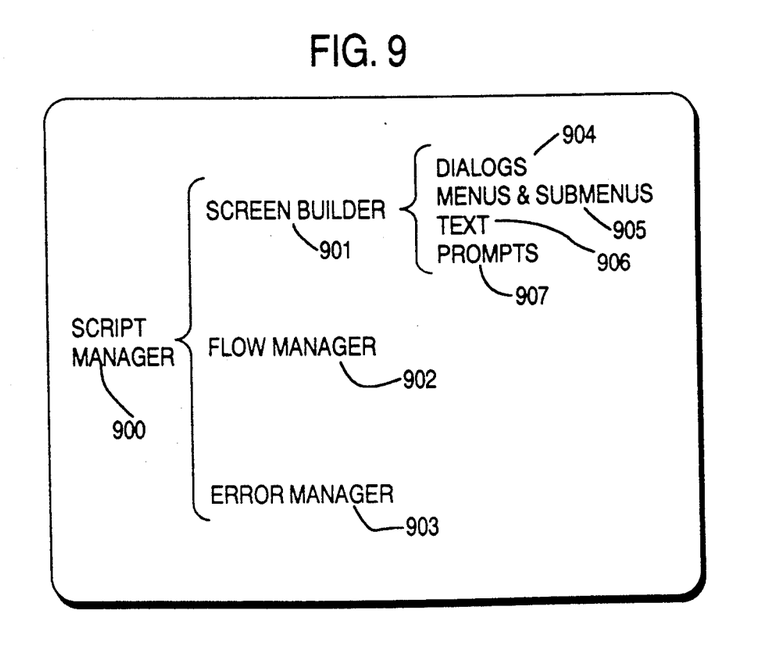
FIG. 9 is a particularized subroutine diagram of the resource manager algorithm of FIG. 8.

Referring now to FIG. 9, there is shown a description of algorithms associated with the resource manager 803 of FIG. 8. The overall purpose of the resource manager is to control personal terminal 1 and to assure a proper retrieval of data which eventually will be displayed at personal terminal 1. The overall program will be referred to as a script manager 900 which must recognize and control the bank customer through the solution of error scenarios which may present themselves via error manager 903. Proceeding, for example, from the main menu to a submenu, returning to the main menu and flowing through a particular option item is the responsibility of flow manager 902. Screen builder 901 builds an appropriate display depending on the point in the transaction at which the screen builder 901 is accessed i.e., during user dialogues 904, the presentation of menus or submenus 905, the presentation of text messages 906 or the presentation of user prompts 907 for date, dollar, number or menu choice such as in response to "Your Choice?".

We claim:

1. A portable personal banking terminal for use in a banking terminal system comprising:
   an m line by n character display where m is between one and four and n is between 12 and 32,
   a data modulator and demodulator for transmitting data over a telephone line,
   an automatic telephone dialer for supervising and actuating a switched telephone connection over a public switched telephone network to a host computer, a data entry means for providing ten plus i selectable choices, the choices comprising ten numerical choices and i functional elements wherein i is between two and ten and
   a controller, coupled to the display, the data modulator and demodulator, the automatic telephone dialer and the data entry means, for encrypting and formatting data in packets for transmission to the host computer, for validating and controlling the display of data entered via the data entry means during any of a local, an initialization or a banking mode of operation, and for controlling actuation of the switched telephone connection to the host computer during the initialization mode of operation, the controller being further responsive to the host computer during the baking mode of operation for controlling the display and storage of text messages, prompts and data transmitted from the host computer,
   the terminal adapted to be handheld and having a front and a rear surface, the front surface providing a location for the data entry means and display and the rear surface providing a pocket for banking forms and a writing table.

2. A portable personal banking terminal as recited in claim 1 where the number of lines m is 2.

3. A portable personal banking terminal as recited in claim 1 where the number of characters n is 16.

4. A portable personal banking terminal as recited in claim 1 where the number of functional elements i is six.

5. A portable personal banking terminal as recited in claim 1 further comprising timing means of the controller for automatically disconnecting the switched telephone connection after a predetermined period of time.

6. A portable personal banking terminal as recited in claim 1 further comprising an alerter for providing an audible signal of short duration for reasonable data entries and a signal of longer duration for clearly erroneous entries.

7. A portable personal banking terminal as recited in claim 1 having a unique identification number, the host computer maintaining a list of all identification numbers of all terminals and personal computers also having unique identification numbers and adaptable to serve the personal terminal with one serving system and a personal computer having access to the same host computer via another serving system by comparing the unique identification number of a personal computer or terminal communicating with the host computer with the list of identification numbers and, responsive to the comparison, selecting the serving system.

8. A portable personal banking terminal as recited in claim 1 comprising remotely controlled timing means, information messages caused to be displayed at the terminal by the host computer being displayed for a programmable display hold time.

9. A portable personal banking terminal as recited in claim 8 where the programmable display hold time is user programmable.

10. A portable personal banking terminal as recited in claim 8 where the programmable display hold time is downloadable from the host computer.

11. A portable personal banking terminal as recited in claim 1 where during the local mode of operation, the terminal is disconnected from the telephone line and the controller is responsive to terminal stored applications software.

12. A portable personal banking terminal as recited in claim 1, the display during a banking mode of operation for displaying the status of a check, the status data being retrieved from the host computer for display responsive to actuation of the data entry means in a predetermined manner following a display of a predetermined prompt.

13. A portable personal banking terminal as recited in claim 12, the status of a check having a particular number being requested via the data entry means.

14. A portable personal banking terminal as recited in claim 12, the status of all checks having a particular data being requested via the data entry means.

15. A portable personal banking terminal as recited in claim 12, the status of all checks having a particular amount being requested via the data entry means.

16. A portable personal banking terminal as recited in claim 12, a listing of all checks pending on a particular day being requested via the data entry means.

17. A portable personal banking terminal as recited in claim 1, the display during a banking mode of operation for displaying the status of a credit or deposit, the status data being retrieved from the host computer for display.

18. A portable personal banking terminal for use in an initialization and a banking mode of operation in a banking terminal system comprising a host computer and for use in a local mode of operation without the banking terminal system, the portable personal banking terminal during the local mode of operation serving as a personal banking manager and during a banking mode of operation under host computer control as a bank information retrieval terminal,
the terminal adapted to be handheld and having a front and a rear surface, the front surface providing means for data entry and display and the rear surface providing a pocket for banking forms and a writing table.

19. A portable personal banking terminal as recited in claim 18 wherein said controller comprises means for receiving the status of at least one check by receiving check status information from said host computer via a modulator and demodulator while said terminal is operating in said banking mode.

20. A portable personal banking terminal as recited in claim 18 and comprising means to display the status of a check retrieved from the host computer.

21. A portable personal banking terminal as recited in claim 18 and comprising:
data entry means;
means to display the status of the check; and
means to receive the status of a check retrieved from the host computer in response to a check number being requested via the data entry means.

22. A portable personal banking terminal as recited in claim 18 and comprising data entry means and means to receive the status of a check retrieved from the host computer responsive to a check amount entered via the data entry means.

23. A portable personal banking terminal as recited in claim 18 and comprising data entry means and means to receive the status of a check retrieved from the host computer responsive to a date of a check entered via the data entry means.

24. A portable personal banking terminal as recited in claim 18 and comprising a data modulator and demodulator for transmitting data over a telephone line between the portable personal banking terminal and the host computer.

25. A portable personal banking terminal as recited in claim 18 and comprising means for encrypting data.

26. A portable personal banking terminal as recited in claim 18 and comprising data entry means.

27. A portable personal banking terminal as recited in claim 18 and comprising a two-line character display.

28. A portable personal banking terminal as recited in claim 18 and comprising a controller for encrypting and formatting data into pockets for transmission to the host computer and for controlling the display of text messages and storage of data.

* * * * *